Dec. 10, 1968     J. M. RAIT     3,415,627
CHEMICAL TESTING APPARATUS
Original Filed June 11, 1962     4 Sheets-Sheet 1
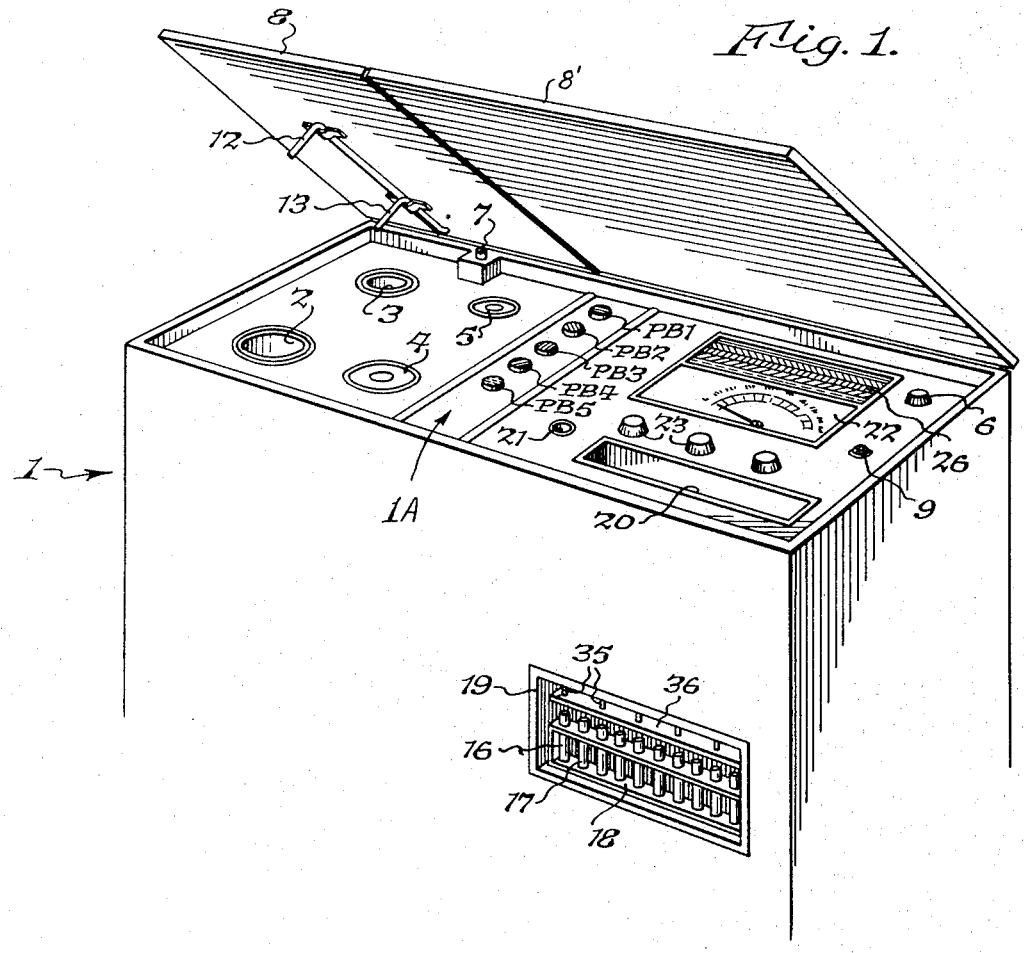
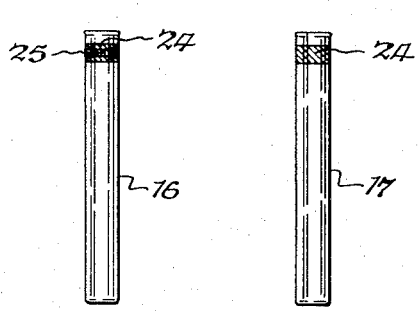
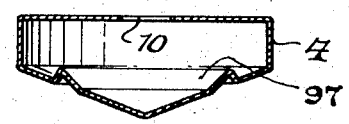
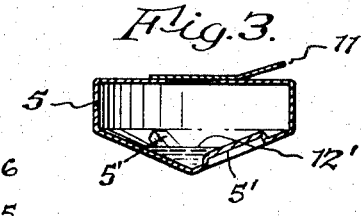
INVENTOR.
Joseph M. Rait
BY
Christel + Bean
ATTORNEYS.

Dec. 10, 1968   J. M. RAIT   3,415,627
CHEMICAL TESTING APPARATUS
Original Filed June 11, 1962   4 Sheets-Sheet 3
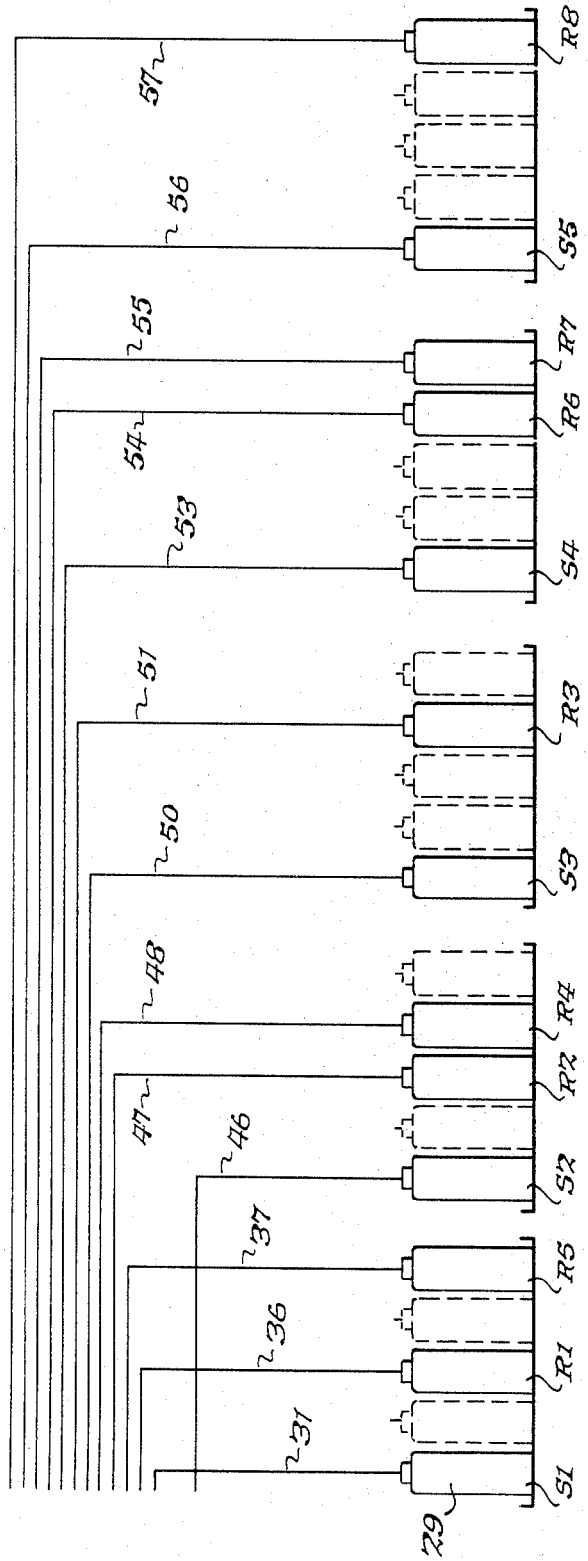
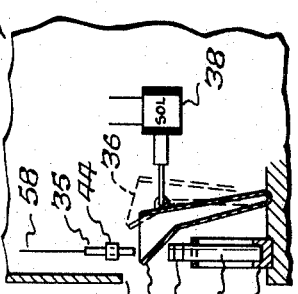
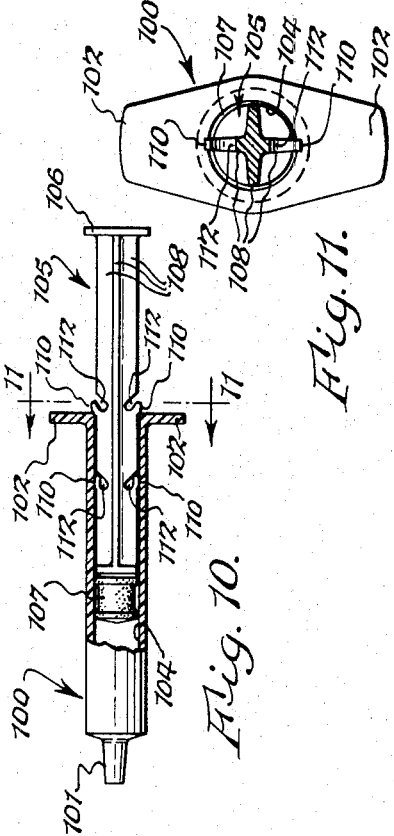
INVENTOR.
Joseph M. Rait
BY
Christel + Bean
ATTORNEYS.

Dec. 10, 1968    J. M. RAIT    3,415,627
CHEMICAL TESTING APPARATUS
Original Filed June 11, 1962    4 Sheets-Sheet 4

INVENTOR.
Joseph M. Rait
BY
Christel + Bean
ATTORNEYS.

United States Patent Office 3,415,627
Patented Dec. 10, 1968

3,415,627
CHEMICAL TESTING APPARATUS
Joseph M. Rait, Snyder, N.Y.
(95 Huxley Drive, Buffalo, N.Y. 14226)
Continuation of application Ser. No. 201,677, June 11, 1962. This application Mar. 29, 1966, Ser. No. 544,648
15 Claims. (Cl. 23—253)

This application is a continuation of my pending application Ser. No. 201,677, filed June 11, 1962, for Chemical Testing Apparatus and Method, now abandoned.

This invention relates to a new and useful method of and apparatus for processing and analyzing liquids. While by no means limited thereto, my invention is particularly useful in the field of blood chemistry.

Heretofore, many body fluid testing procedures could be performed only by skilled technicians, capable of carrying out the various treatment and testing steps required. As a result, such tests usually have been conducted at clinics or in laboratories, and not in the offices of the doctor who takes the sample but must send it out to be tested.

A primary object of my invention is to provide a testing apparatus for blood and other body fluids which can be operated by relatively unskilled personnel, and which will automatically perform various chemical analyses on blood and other fluids.

That this object is accomplished with the apparatus of my invention is evidenced by the fact that the operator merely places a liner into a receptacle, deposits a sample of the fluid to be tested in the liner, and presses control buttons denoting the tests to be performed. The apparatus auomatically prepares final standard and sample solutions, and the operator merely inserts them in a colorimeter from which a direct reading can be taken.

In testing procedures where the sample is compared with a standard, a problem arises, because the processed sample will vary with variations in temperature, line voltage, reagents, and other factors involved in the preparation of the sample solution. Therefore, the same sample might vary widely with respect to a given standard solution.

Therefore, it is another object of my invention to provide a method and apparatus in which a standard solution is freshly prepared for each test, and for each sample under test.

Still another object of my invention is to accomplish the foregoing in an apparatus which, while relatively simple to operate, is durable and dependable, can be constructed and operated at a cost making it practical for use in relatively small offices, and will consistently provide a degree of accuracy equaling and often exceeding that which is obtained utilizing routine laboratory procedures.

The method of my invention is characterized in one aspect thereof by the steps of processing a sample of the fluid under test to produce a sample solution, and substantially simultaneously processing a standard in substantially the same manner as the sample, thereby producing a fresh standard solution under substantially the same conditions as the sample solution, whereby variations incident to processing will affect both solutions.

The apparatus of my invention is characterized in one aspect thereof by the provision of sample supply means, standard supply means, processing means common to the standard and sample supply means and operable to prepare standard and sample solutions for comparison testing, and means operable to place first the standard supply means and then the sample supply means in communication with the processing means, whereby a standard solution is procesed before the sample solution.

In another aspect thereof, the apparatus of my invention is characterized by the provision of sample supply means standard supply means, processing means associated with the supply means for preparing standard and sample solutions for comparison testing, and means causing the processing means to prepare a fresh standard solution for each sample solution.

The apparatus of my invention is further characterized in still another aspect thereof by the provision of extractor means including a receptacle for a sample to be tested, the receptacle having an axis about which it is rotated, with conduit means adapted for communication with processing means and having an intake end extending along the receptacle axis and into the receptacle while the same is being rotated.

The apparatus of my invention also is characterized, in other aspects thereof, by the provision of disposable liners for the sample extractor, a disposable hypodermic having means automatically operable to indicate when a predetermined amount of fluid to be tested has been withdrawn and ejected, and disposable cuvettes eliminating any necessity for cleaning thereof.

The foregoing and other objects, advantages and charactering features of the method and apparatus of my invention will become clearly apparent from the ensuing detailed description of one, presently contemplated illustrative embodiment thereof, taken in conjunction with the accompanying drawings illustrating the same wherein like reference numerals denote like parts throughout the various views and wherein:

FIG. 1 is a fragmentary, isometric perspective view of the cabinet housing the apparatus of my invention, with the top cover open to expose the extractor bowls and control console;

FIGS 2, 2A and 3 are transverse sectional views of three types of disposable, sample receiving liners for the extractor bowls;

FIGS. 4 and 5 are side elevational views of disposable color coded cuvettes into which these standard and sample solutions are delivered after processing;

FIGS. 6 and 7 are intended to be placed side by side, and together comprise a schematic layout of an apparatus of my invention;

FIG. 8 is a fragmentary, detail view taken about on line 8—8 of FIG. 6;

FIG. 10 is a view, partly in side elevation and partly in longitudinal section, of a hypodermic of my invention; and FIG. 11 is a transverse sectional view thereof, taken about on line 11—11 of FIG. 10.

Figure 6:
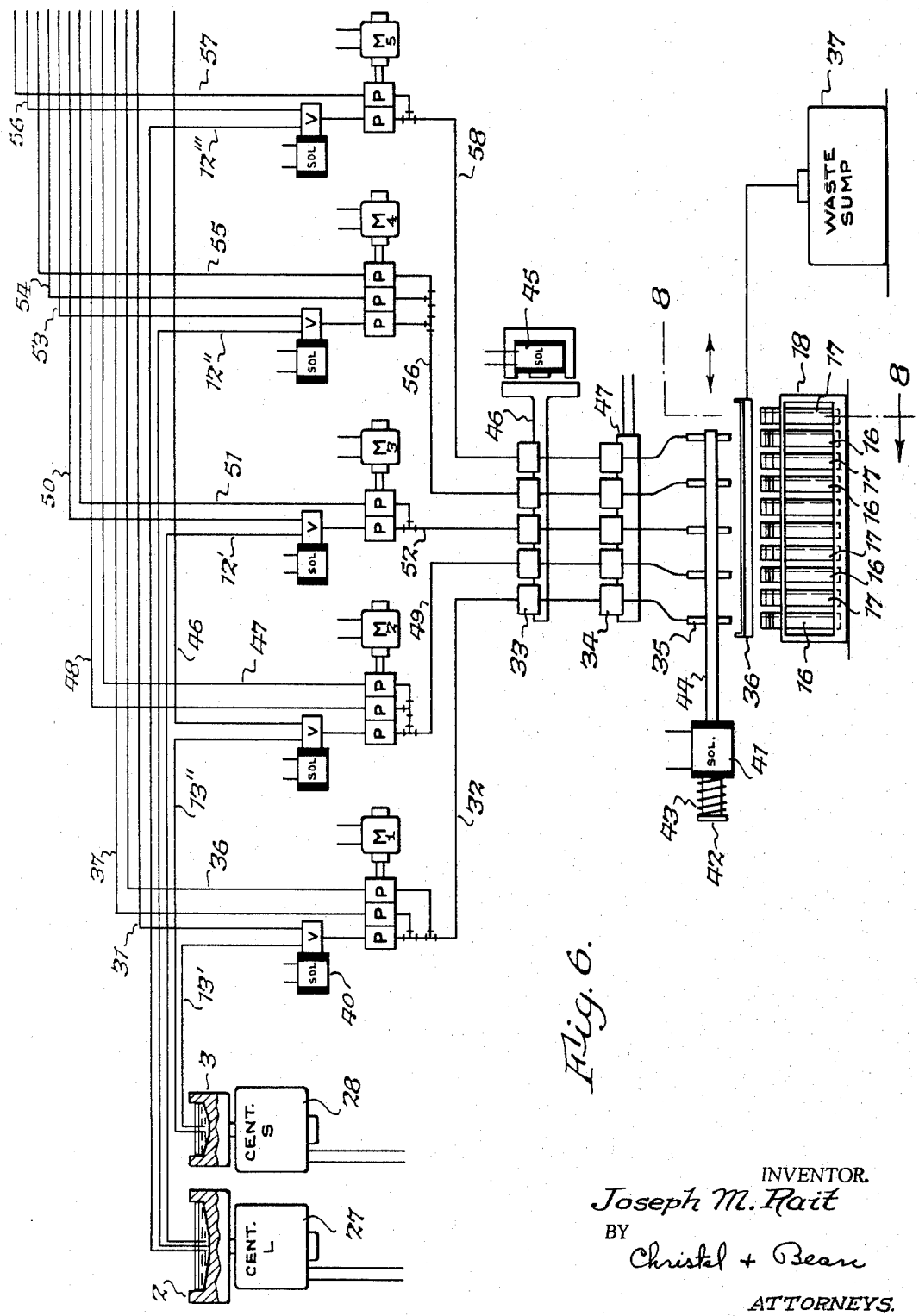

Referring now in detail to the accompanying drawings, it will be seen that the apparatus of my invention includes an enclosing housing, generally denoted 1, having a recessed top wall containing a pair of extractor bowls 2 and 3. Bowls 2 and 3 are adapted to receive individual, disposable liners 4 and 5, respectively, and are provided with suitable means, not shown, for releasably retaining liners 4 and 5 therein. The liners are stacked in storage dispensers, of known type, which present the uppermost liner in each stack thereof for removal.

A control console, generally designated 1A, and generally under cover 8' also is positioned in the top wall, closely adjacent the extractor bowls and liner dispensers, and includes a number of normally open, pushbutton switches PB1–PB5 for selecting the different tests to be performed. A master switch 6 is provided, to turn on the apparatus, and an interlock switch 7 is provided to insure that actual processing does not begin until the hinged cover 8 is lowered to enclose the extractor bowl portion of the apparatus. A separate hinged cover 8' is provided for the control console. Cover 8 carries a pair of intake conduits, for withdrawing fluids from liners 4 and 5 in bowls 2 and 3, respectively.

The liners 4 and 5 are disposable, being made of an inexpensive plastic or other suitable material. In the illustrated embodiments, they have a generally circular outline with a dished bottom, although the particular configurations can be varied. Liner 4 has an opening 10 through its top wall, for injecting the test sample and for receiving a conduit 12. Liner 5 has a similar opening which is closed by a cover 11 because of the deproteinizing reagent 12' provided in the liner 5. Cover 11 is removed to inject the test sample into liner 5, whereupon the reagent 12' will immediately start to react with the sample, and to receive the withdrawal conduit 13.

Liner 5 also is provided with mixing vanes. In the illustrated embodiment, these take the form of three hollow, internal ribs 5', formed integrally with the liner and equally spaced about the axis thereof.

Liner 4 is provided with a trap comprising an annular wall 97, concentric with the side wall, extending upwardly from the bottom wall. Wall 97 serves to trap the heavier constituents, once they have been separated.

FIG. 2A shows still another disposable liner 4', of frustro-conical wall form, wherein the blood cells are caused to move outwardly and downwardly, settling on the bottom as indicated at 95. The plasma 96 remains on top, to be withdrawn by conduit 13 which extends into the plasma 96, but stops short of the layer 95. Liner 4' can be provided with an adaptor, not shown, making it interchangeable with liner 4.

In use, switch 6 is closed, to start up the apparatus, and a light 9 indicates when the heating element is ready. The operator lifts a liner 4 and a liner 5 out of their respective delivery mechanisms, and places them in the appropriate extractor bowls 2 and 3.

When the liners are in their respective extractor bowls, and the sample has been injected into each liner, cover 8 is closed. This closes switch 7, causing the apparatus to start processing and automatically positions the intake ends of conduits 12 and 13 in the liners 4 and 5, respectively.

The apparatus automatically processes separate sample and standard solutions, for each test to be performed, by means to be described. When the preparation is completed, a buzzer 14 (FIG. 9) is energized to signal the operator that the various sample and standard solutions are ready.

The standard solutions are dispensed by the apparatus into disposable cuvettes 16 (FIG. 4), and the test or sample solutions are dispensed into similar disposable cuvettes 17 (FIG. 5). The cuvettes 16 and 17 are carried in a holder 18, like a test tube rack, which is positioned in a well 19 in the front of cabinet 1 for receiving the solutions. When the solutions are ready, the operator lifts the entire rack of cuvettes out of well 19 and places it in a well 20 in the top wall console portion, for ease of access. A cuvette 16, containing a standard solution, is inserted in a test well 21 and the colorimeter, generally indicated at 22 and provided with a number of control knobs 23, is referenced to that standard. Then a cuvette 17, containing a corresponding sample solution, is inserted in well 21 and the colorimeter reading is referred to the appropriate color coded scale which directly indicates the test result.

The illustrated apparatus will perform five different tests, and is arranged to prepare the five standard solutions simultaneously, followed immediately by simultaneous preparation of five sample solutions. To avoid confusion, and assist the operator, the various tests are distinguished by means of color coding. Thus each pushbutton PB1–PB5 is of a different color, shown as blue, green, red brown and gray in the illustrated embodiment, although other colors obviously can be used. Cuvettes 16 and 17 are provided with color bands 24, which are colored to correspond to the code colors of the various tests, and one set of cuvettes, in this instance the standard cuvettes 16 have an additional band or mark 25 to distinguish them from the other set of cuvettes. The colorimeter dial from which the readings for the various tests are taken, is correspondingly color coded, as indicated at 26. The number of tests which can be performed by the apparatus of my invention, and the particular tests which are performed, can be varied as desired.

Turning now to FIGS. 6, 7 and 8, it will be seen that extractor bowls 2 and 3 are arranged to be spun or rotated about their respective axis by motors 27 and 28, respectively. The speed of rotation is such as to produce blood plasma within liner 4 or 4' and a deproteinized filtrate in liner 5. In this manner, a true filtrate is provided, and not just a small percentage sampling. I prefer that the standard solution be prepared first, while the samples are being extracted, and that the processing lines and apparatus initially be purged by the standard solution and its components. Assume that button PB1 has been pushed to perform test number 1. A solenoid valve V1 normally blocks sample line 13' and places standard line 31 in communication with process line 32. The standard base fluid S1 is drawn through line 31 by one of a series of pumps P driven by a motor M1. For this particular test there are three pumps P, with one of them arranged to draw either the standard S1 through line 31 or the sample through line 13'. The other pumps P are arranged to draw reagents R1 and R5 from the containers for the various standards and reagents which can comprise any suitable liquid containers 29, carried by a shelf or holder device 30.

The standard S1 is pumped through line 32 to a mixing device 33, then to a heating device 34, and finally to a dispensing outlet 35. As the standard S1 is drawn through line 31, reagents R1 and R5 are drawn through lines 36 and 37 and pumped into line 32 where they are combined with standard S1.

Initially, the standard solution components are used to purge the lines 31, 32, pumps P, the mixing and heating devices 33 and 34, and outlet 35. To this end, the apparatus initially dispenses the standard solution into a waste drain 36 which leads to a sump 37. Then after sufficient fluid has passed for the desired purging, waste drain 36 is shifted by a solenoid 38 to the position indicated in phantom in FIG. 8, whereupon the final standard solution is dispensed into the cuvette 16 for that test.

When a sufficient quantity of standard solution has been prepared, solenoid 40 is energized to shift valve V1 to draw the sample from extractor 3 through the line 13', and into the line 3. Simultaneously waste drain 36 is returned to its full line, normal position, until the sample solution is ready for dispensing into cuvette 17. The pumps continue to draw reagents R1 and R5 into line 32, whereby the sample solution is mixed at 33, heated at 34, and otherwise prepared in the same manner as the standard solution. A solenoid 41 is energized to retract its armature 42 against a spring 43 and thereby shift the dispensing nozzle carrier 44, to the right in FIG. 6, to position the dispensing nozzle outlet 35 over the cuvette 17 for that test.

Drain 36 is in waste position at all times, except when solutions are being dispensed into the cuvettes.

All of the foregoing is accomplished automatically, by means to be described. The mixing can be accomplished by any desired mixing means, such as for example a make and break vibrator type of solenoid motor 45 for shifting an armature 46 back and forth to agitate the solutions passing through the mixing chamber 33 carried thereby. The heating device can be of the fluid bath type, with a stirring device as indicated at 47 for maintaining uniform temperature throughout the bath.

The procedure is the same, for each of the various tests, except that the number and point of application of the reagent solutions will vary from test to test. This is shown in FIG. 7, wherein the broken line representations indicate that other, or additional reagent containers might be provided. While each test procedure might require only one reagent, any number of reagents can be provided and there would only have to be provided a corresponding number of pumps and lines for withdrawing each reagent through its own pump and line. Thus, in test procedure No. 2, the standard S2 will be drawn through line 46, and reagents R2 and R4 will be drawn through lines 47 and 48, the procedure being the same as before except that reagent R4 will be mixed with reagent R2 prior to entry thereof into the processing line 49.

In test No. 3, standard S3 will be drawn through line 50 and one reagent R3 will be drawn through line 51 and combined with the standard in process line 52. For test procedure No. 4, the standard S4 is drawn through line 53, while the reagents R6 and R7 are drawn through lines 54 and 55, and as in test No. 2, mixed together prior to delivery thereof into process line 56. In test No. 5 the standard S5 is drawn through line 56, and the one reagent R8 through line 57, the two being combined in line 58. However, it will be appreciated that this arrangement is only illustrative of the variations which are possible.

The pumps P are ganged together to be driven by the various motors M1–M5, as shown, and I prefer to use piston pumps having built in check valves so that when the pump is not being driven, it closes the line in which it is connected. By using each pump for only one line, the pumps are not cross contaminated in any way, and only the one fluid passes through each line and pump until they are combined. By wasting the initial discharge, all of the standard and reagent lines are initially clean.

Figure 9:
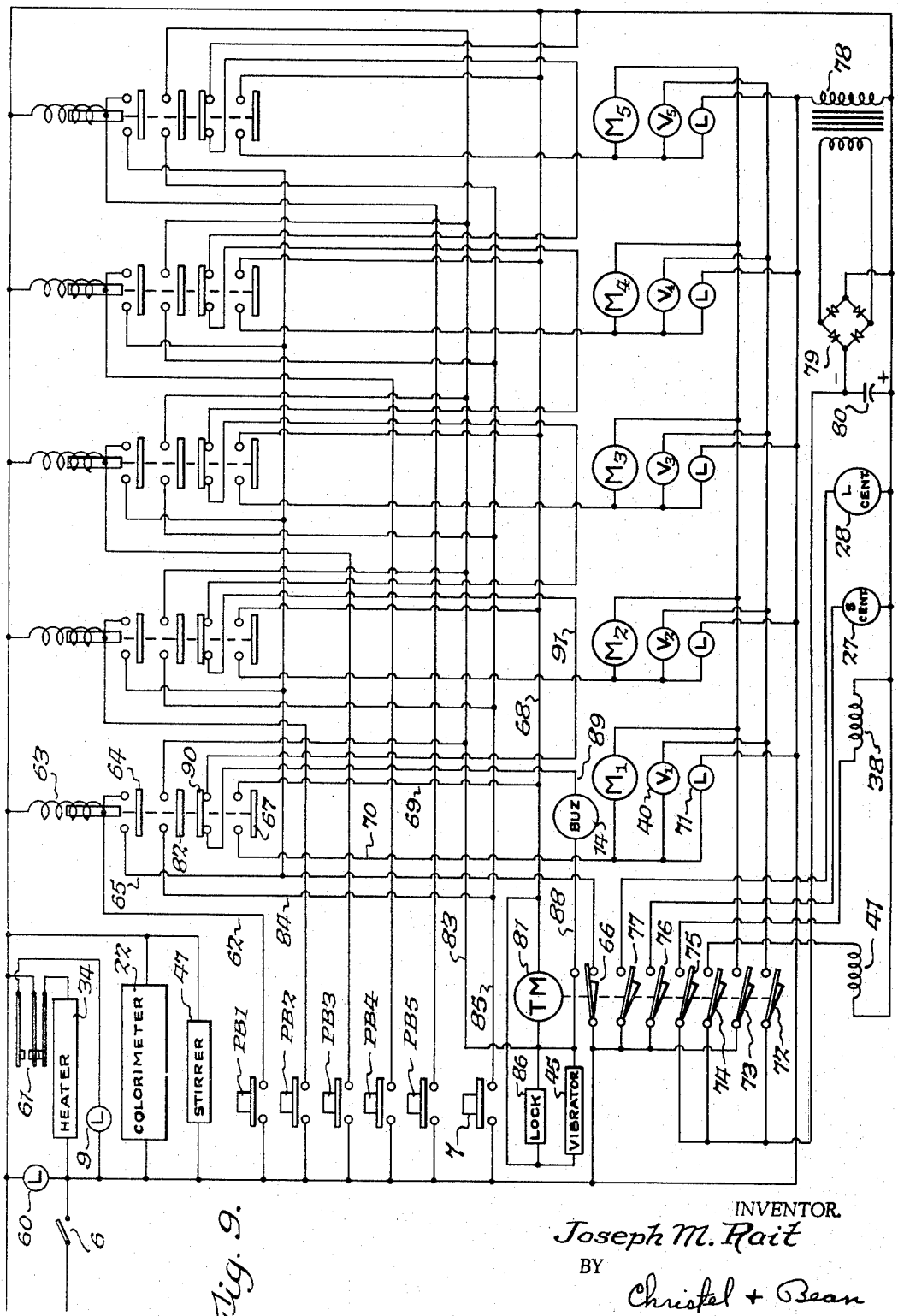
FIG. 9 is a wiring diagram of the control circuits of my invention.

The control circuit for the various solenoids and motors is illustrated in FIG. 9, from which it is seen that all of them are energized from a common source, not shown, which could be 110 volts A.C., under control of the main start switch 6. When this switch is closed, a light 60 is illuminated, showing that the system is on, and this light can illuminate the dial of colorimeter 22. When heater 34 is at the proper bath temperature, thermostat switch 61 opens the energizing circuit to the heater and closes an energizing circuit for light 9, indicating that the apparatus is ready.

Assume that test No. 1 is initiated by closing pushbutton switch PB1. This closes a circuit through a line 62, to energize a relay 63. Relay 63 then closes a switch 64, completing a relay holding circuit through lines 62 and 65, and switch 66. Relay 63 also closes a switch 67, which completes an energizing circuit through lines 68, 69 and 70 to a light 71 which can be contained within pushbutton PB1 to illuminate the same and thereby indicate that test procedure No. 1 has been activated. Switch 67 also prepares an energizing circuit for solenoid 40 of valve V1 and pump motor M1, under control of normally open switches 72 and 73, respectively. Switches 74 and 75 control the energization of the dispensing outlet and waste drain control solenoids 41 and 38, respectively, while switches 76 and 77 control the energization of extractor motors 27 and 28, respectively. Solenoids 41 and 38, and motors 27 and 28 are energized by direct current, through transformer 78 and bridge rectifier 79, with a filtering condenser 80 being inserted across the D.C. line.

Switches 66 and 72–77 are under control of a timer motor 81 which is energized by a circuit including lines 68 and 83, switch 82, and lines 84 and 85 and controlled by the normally open lid switch 7. Therefore, the timer motor will not start to operate, and only the relay holding circuit will be energized, until cover 8 is closed, to close lid switch 7. Vibrator motor 45 is similarly controlled by switches 82 and 7, which also actuate a lock 86 to hold the cover 8 in its closed position pending completion of the sample and standard solution processing operations.

As clearly evident from FIG. 9, control circuits are provided for each test procedure, with the respective test circuits being activated by pushbuttons PB2–PB5 under control of switch 6 and interlock switch 7 and timer motor 81. Since they are identical with relay 63 and associated control circuits just described with reference to test No. 1, it is believed that detailed description and tracing of the control circuits for test procedures 2 through 5 would be needless repetition.

Timer motor 81 rotates a cam for controlling the various switches 66 and 72–77 in predetermined sequence, and is designed so that the switches 76 and 77 are closed first to energize the extractor motors. Switch 73 also is closed at this time, completing a circuit to pump motor M1, causing the associated pumps P to draw the standard S1 and reagents R1 and R5 into process line 32. The initial standard solution is dispensed to waste. Then, switch 75 is closed, to energize waste control solenoid 38 and shift waste drain 36 out of the way. After an appropriate time interval, switch 72 closes to energize solenoid 40. This causes the pump P to draw sample fluid, which by now has been extracted, from the extractor bowl. Switch 74 then closes, to energize solenoid 41 and shift the dispensing nozzles 35 into alinement with the sample solution cuvettes 17.

When preparation of the solutions has been completed, switch 66 opens the relay holding circuit, deenergizing relay 63, and closes an energizing circuit to buzzer 14 through line 88 and the normally open contact of switch 66, line 89, switch 90 and line 91, signaling the operator that the various solutions are ready. The operator then compares the sample solutions with the standard solutions, in the colorimeter which is first standarized to the respective standard solutions. In doing this, the dial is set to a predetermined reference, for each standard solution. The dial indication for the sample solution is then directly interpreted from the various color coded scales provided.

FIGS. 10 and 11 show a disposable hypodermic having a barrel 100 terminating at one end in a fitting 101 for a conventional needle, not shown, and having a single grip portion 102 at its opposite end. The bore 104 of the barrel is traversed by a plunger 105 having at one end a thumb bearing portion 106 and carrying a piston 107 at its opposite end.

The plunger stem is of cruciform cross section, as shown at 108, with two of the section flanges carrying yieldable detents 110 extending laterally therebeyond. The detents 110 are undercut, as shown at 112, whereby they can be compressed inwardly as the plunger stem moves inwardly along the barrel. More than one pair of detents 110 and undercuts 112 will be provided, FIG. 10 showing two pair.

In operation, the plunger 105 is withdrawn, to extract blood or whatever fluid is being tested. The operator then depresses the plunger to inject part of the sample into a liner 104. As the first set of detents 110 engages the barrel 100 they resist further inward movement, indicating by feel alone that the necessary quantity of fluid has been ejected. The operator then ejects the second portion of fluid into a liner 5, with the second set of detents resisting further inward movement, as illustrated in FIG. 10. The entire hypodermic will be made of an inexpensive plastic and offers the advantage that it can be disposable and does not require direct reading of a measuring scale by the operator.

Accordingly, it is seen that my invention fully accomplishes its intended objects, providing an apparatus which can be used by unskilled personnel to prepare solutions and perform comparison tests and analyses with consistent accuracy. While I have disclosed only one, illustrative embodiment, that has been done by way of illustration only without throught of limitation.

Having fully disclosed and completely described my invention, and its mode of operation, what I claim as new is.

1. Apparatus of the class described comprising, processing means operable to prepare a sample solution, a housing enclosing said processing means, extractor means including a receptacle having an axis and means for rotating said receptacle about said axis, a cover movable relative to said housing between an open position exposing said extractor means and a closed position covering the same, and means for withdrawing a sample fluid from said receptacle including a conduit carried by said cover for movement therewith, said conduit being arranged for communication with said processing means and having an intake end positioned in said receptacle along said axis when said cover is in said closed position.

2. Apparatus as set forth in claim 1, together with control means for said processing means including a normally open switch, and means closing said switch when said cover is in said closed position.

3. Apparatus as set forth in claim 1, wherein said receptacle comprises an extractor bowl, together with a disposable liner for said extractor bowl.

4. Apparatus of the class described comprising, sample supply means, standard supply means, processing means common to said standard and sample supply means and operable to prepare standard and sample solutions for comparison testing, and means operable to place first one of said supply means and then the other of said supply means in communication with said processing means, whereby first one solution and then the other solution is processed, wherein said sample supply means includes a receptacle for a sample to be tested, said receptacle being symmetrical about an axis, means for rotating said receptacle about said axis to extract from a sample therein, and supply line means arranged to extend into said receptacle along said axis for withdrawing therefrom.

5. Apparatus for preparing samples and standards for comparison testing comprising sample supply means including a centrifuge extractor and a first supply conduit arranged for communication therewith, standard supply means including a second supply conduit separate from said first conduit, processing means common to said standard and sample supply means and adapted for communication alternately with said standard and sample supply conduits, control means for said apparatus including activating switch means and means initially placing said common processing means in communication with one of said supply conduits, said control means also including timer means automatically operable to shift said common processing means out of communication with said one supply conduit and substantially immediately thereafter into communication with the other of said supply conduits for processing of the sample and standard to be compared in substantially immediate sequential relation to thereby provide substantial identity in the processing of the sample and standard to be compared, said control means being automatically operable to place said common processing means in communication with said second supply conduit to process a standard for each time that said common processing means is placed in communication with said first supply conduit to process a sample, whereby a fresh standard is prepared for each processed sample.

6. Apparatus as in claim 5, together with common reagent supply means including a third supply conduit separate from said first and second conduits, said third conduit communicating with said processing means.

7. Apparatus as in claim 6, wherein said process means includes a common process conduit adopted for communication with said first and second conduits, together with separate pumps in said process and reagent conduits, said third conduit communicating with said process conduit down-stream of the pump therein.

8. Apparatus as set forth in claim 5, wherein said control means place said standard supply conduit in communication with said processing means prior to said sample supply conduit whereby it is the standard which is processed first.

9. Apparatus as set forth in claim 8, wherein said control means includes means automatically operable to initially discharge the processed standard to waste.

10. Apparatus as set forth in claim 5, wherein said processing means includes mixing means.

11. Apparatus as set forth in claim 5, wherein said processing means includes heating means.

12. Apparatus as set forth in claim 5, wherein the processed sample and standard are solutions, together with solution discharge means communicating with said processing means, said control means including means operable automatically to shift said discharge means from a first position for discharging of standard solution to a second position for discharging of sample solution.

13. Apparatus for preparing samples and standards for comparison testing comprising sample supply means, including a first conduit, standard supply means including a second conduit separate from said first conduit, processing means operable automatically to prepare standard and sample solutions for comparison testing, reagent supply means common to said standard and sample supply means including third conduit means separate from said first and second conduits communicating with said processing means, and control means automatically operable to place said first and second conduits in communication with said processing means and to place said second conduit in communication with said processing means for each time that said first conduit is placed in communication therewith, thereby causing said processing means to prepare a fresh standard solution for each sample solution, wherein said processing means are common to said standard and sample supply means for substantial identity in the processing of the solutions to be compared, said control means including means alternately connecting said processing means to said sample and standard supply conduits, wherein said supply means include a pair of centrifuge extractor bowls, and wherein said supply conduits include a first separate supply conduit from each of said bowls.

14. Apparatus for preparing samples and standards for comparison testing comprising sample supply means including a centrifuge extractor and a first conduit communicating therewith, standard supply means including a second conduit separate from said first conduit, processing means common to said sample and standard supply means and operable to successively prepare samples and standards for comparison testing, and control means automatically operable to actuate said extractor and to place said processing means in communication with said standard supply means to process a standard while the sample to be compared therewith is being extracted, said control means including timer means automatically operable to thereafter shift said processing means out of communication with said standard supply means and into communication with said extractor to process the extracted sample, whereby a fresh standard is provided for each processed sample.

15. Apparatus for preparing samples and standards for comparison testing comprising sample supply means including a first conduit, standard supply means including a second conduit separate from said first conduit, processing means operable automatically to prepare standard and sample solutions for comparison testing, reagent supply means common to said standard and sample supply means including third conduit means separate from said first and second conduits communicating with said processing means, and control means automatically operable to place said first and second conduits in communication with said processing means and to place said second conduit in communication with said processing means for each time that said first conduit is placed in communication therewith, thereby causing said processing means to prepare a fresh standard solution for each sample solution, wherein said processing means are common to said standard and sample supply means for substantial identity in the processing of the solutions to be compared, said control means including means alternately connecting said processing means to said sample and standard supply conduits, wherein said sample supply means includes a centrifuge extractor, said first conduit being arranged for communication with said extractor.

References Cited

UNITED STATES PATENTS

| | | | |
|---|---|---|---|
| 1,792,757 | 2/1931 | Parker et al. | 23—253 |
| 2,715,610 | 8/1955 | Thompson | 23—253 |
| 3,033,656 | 5/1962 | Saifer et al. | 23—259 |
| 3,081,158 | 3/1963 | Winter | 23—253 |
| 3,098,719 | 7/1963 | Skeggs | 23—253 |
| 3,108,954 | 10/1963 | Steinacker | 233—21 |
| 3,116,118 | 12/1963 | Whitehead et al. | 23—253 |
| 3,148,146 | 9/1964 | Asnes et al. | 233—26 X |
| 3,186,800 | 6/1965 | Strickler | 23—253 |
| 3,015,544 | 1/1962 | Shaffer et al. | 23—230 |

OTHER REFERENCES

Fister, Harold J.: Manual of Standardized Procedures for Spectrophotometric Chemistry, Standard Scientific Supply Corporation, New York (1950), Introduction, pages 1 and 2, method A–10.1 to A–10.3, and method A–12.1 to A–12.3

MORRIS O. WOLK, *Primary Examiner.*

R. E. SERWIN, *Assistant Examiner.*

U.S. Cl. X.R.

23—230, 259